United States Patent

Hendriks et al.

Patent Number: 5,537,273
Date of Patent: Jul. 16, 1996

[54] SPEED AND SKEW INDEPENDENT, AIR BEARING SLIDER

[75] Inventors: Ferdinand Hendriks, Yorktown Heights, N.Y.; Mark E. Re, Los Gatos, Calif.

[73] Assignee: International Business Machines Corporation, Armonk, N.Y.

[21] Appl. No.: 379,125

[22] Filed: Jan. 27, 1995

Related U.S. Application Data

[63] Continuation of Ser. No. 82,205, Jun. 24, 1993, abandoned.

[51] Int. Cl.$^6$ .............................. G11B 17/32; G11B 5/60
[52] U.S. Cl. ................................................. 360/103
[58] Field of Search .................................. 360/102, 103

[56] References Cited

U.S. PATENT DOCUMENTS

| | | | |
|---|---|---|---|
| 3,197,751 | 7/1965 | Felts | 340/174.1 |
| 3,573,768 | 4/1971 | Harris | 340/174.1 |
| 4,218,715 | 8/1980 | Garnier | 360/103 |
| 4,605,977 | 8/1986 | Matthews | 360/103 |
| 4,673,996 | 6/1987 | White | 360/103 |
| 4,734,803 | 3/1988 | Nishihira | 360/103 |
| 4,757,402 | 7/1988 | Mo | 360/103 |
| 4,802,042 | 1/1989 | Strom | 360/103 |
| 4,870,519 | 9/1989 | White | 360/103 |
| 4,893,204 | 1/1990 | Yamada et al. | 360/103 |
| 4,894,740 | 1/1990 | Chhabra et al. | 360/103 |
| 4,984,114 | 1/1991 | Takeuchi et al. | 360/103 |
| 5,021,906 | 6/1991 | Chang et al. | 360/103 |
| 5,062,017 | 10/1991 | Strom et al. | 360/103 |
| 5,267,104 | 11/1993 | Albrecht et al. | 360/103 |
| 5,267,109 | 11/1993 | Chapin et al. | 360/103 |

FOREIGN PATENT DOCUMENTS

| | | | |
|---|---|---|---|
| 298872 | 10/1992 | Japan | 360/103 |

OTHER PUBLICATIONS

IEEE Transactions on Magnetics, vol. 25, No. 5, Sep., 1989—pp. 3713-3715 An Air Bearing Minimizing the Effects of Slide Skew Angle—Clifford/Henze—Hewlett Packard Labs.
Research Disclosure, Jan., 1991, No. 321—91A060236 Balster, Carlson & Harwood—Magnetic Head with Arrow-Shaped Air Bearing Surface.
Tribology & Mechanics of Magnetic Storage Systems, vol. III—ASLE Special Publication SP-21 pp. 95-101—An Air Bearing Slider w/Uniform Flying Height & Fast Take-Off Characteristics—J. W. White, Oct. 1986.

Primary Examiner—Stuart S. Levy
Assistant Examiner—George J. Letscher
Attorney, Agent, or Firm—Ohlandt, Greeley, Ruggiero & Perle

[57] ABSTRACT

An air bearing slider incorporating the invention has both front and rear pads extending from a generally planar body. Both pads have bearing faces separated by a gap that is substantially in excess of any fly height of the slider. The sides of both pads are oriented at a rake angle that is approximately equal to the maximum expected skew angle. The separation of the pads enables the slider to exhibit good pitch stability, and the pad rake angles provide resistance to roll effects that occur at large skew angles. Both pad faces exhibit extremely small taper angles that enable "inlet throttling" of air entrained by the slider. Such inlet throttling provides the slider with a fly height that is substantially independent of relative speed changes between the slider and a recording medium. A further embodiment includes a rear slider for contact recording applications.

19 Claims, 3 Drawing Sheets

SPEED AND SKEW INDEPENDENT, AIR BEARING SLIDER

This is a continuation of application Ser. No. 08/082,205 filed on Jun. 24, 1993, now abandoned.

FIELD OF THE INVENTION

This invention relates generally to magnetic head, gas bearing slider assemblies, and more particularly, to air bearing slider assemblies that exhibit a fly height that is substantially independent of recording media speed and skew variations.

RELATED PATENT APPLICATION

This patent application is related to U.S. patent application Ser. No. 08/082,210, entitled Speed Independent Air Bearing Slider, filed on even date herewith.

BACKGROUND OF THE ART

Over more than three decades, various gas bearing slider designs (e.g. air bearing sliders) have been created in an attempt to solve the problem of fly height variation. While there is no generally agreed upon single "figure of merit" for an air bearing slider, it is undeniable that it should, at least, have the following qualities: low stiction; low take-off and landing speeds; a low sensitivity of fly height to skew angle variations (i.e. angle between the central axis of the slider and the axis of movement of the recording media); and a low sensitivity of fly height to disk speed variations and to manufacturing errors, such as crown (a distortion of the slider). For magnetic recording purposes, constancy of recording gap is important, even in the presence of disturbing mechanical excitations, e.g., disk roughness, spindle run-out, aerodynamic buffeting, etc.

The prior art evidences a number of techniques for attempting to overcome the aforementioned effects and disturbances. U.S. Pat. No. 3,197,751 to Felts shows a flying magnetic head assembly wherein a generally planar slider has a recording head mounted behind its trailing edge. The recording head is positioned so that it penetrates an air film over the disk and maintains that position irrespective of moderate variations of angle of attack between the slider and the disk surface. The leading edge of the slider is rounded or beveled to provide a "ski nose" to enable air to be compressed beneath the slider.

U.S. Pat. No. 3,573,768 to Harris illustrates an air bearing slider that includes a pair of stepped regions, one upstream from another. The two level steps enable a low stiction line contact between the slider body and the recording surface when the recording surface is at rest. Further, as a result of the height difference between the steps, no taper is required of the step surfaces. The distance between the front and rear steps is indicated as being approximately equal to the desired flying height of the slider. Harris states that this distance should be approximately 50 microinches.

Chang et al. in U.S. Pat. No. 5,021,906 disclose a programmable air bearing slider which includes the separated front and rear air bearing surfaces, separated by a central non-air bearing region. The central region is recessed and includes a piezoelectric element that is capable of deforming the slider. The front air bearing surface includes a tapered leading portion (approximately 10 milliradians) and the rear air bearing surface has no taper angle. By appropriate control of the piezoelectric element, a curvature is induced in the central region thereby lowering the fly height of a head attached to the rearmost portion of the slider.

Matthews in U.S. Pat. No. 4,605,977 discloses another version of an active-control air bearing slider. In this instance, however, Matthews employs a railed slider with a piezoelectric element that enables a lead taper angle of the slider to be adjusted to achieve a desired flying height.

A widely used air bearing slider configuration includes a body with a pair of rails that are oriented parallel to the direction of movement of the recording surface. The aerodynamics of a railed slider make its fly height particularly susceptible to skew angle variations. With the popularity of rotary arm actuators, much attention has been given to reducing the effects of skew on railed sliders. Railed sliders also exhibit strong, so-called side leakage of air from beneath the rails. As side leakage varies with disk speed, undesirable variations in fly height of the slider occur as disk speed varies from inner to outer disk tracks. Furthermore, railed sliders generally exhibit large front taper angles that substantially affect a slider's speed dependence.

In U.S. Pat. No. 4,870,519 to White, a railed air bearing slider assembly is described wherein each rail has a tapered forward end to provide a converging inlet to achieve a fluid air film beneath the rails. Additionally, each rail has at least one longitudinal angled contour to compensate for skew. Additional description of the structure described by White can be found in "An Air Bearing Slider With Uniform Flying Height and Fast Take-Off Characteristics", Tribology and Mechanics of Magnetic Storage Systems, Volume III, ASLE Special Publication SP-21, American Society of Lubrication Engineers, Park Ridge, Ill. pages 95–101.

In U.S. Pat. No. 4,673,996, to White, a slider is described in which the loss of lift of a slider due to skew is compensated by steps on the slider's side rails. The step height is typically adjusted to a precise value to achieve a fly height of a desired type (such as a flat profile) under steady flying conditions. This principle was given the name TPC ("Transverse Pressure Contour"). Sliders of the TPC type are typically highly speed sensitive and are also sensitive to skew variations that result from the angular velocity of an actuator arm.

Clifford et al in "An Air Bearing Minimizing the Effects of Slider Skew Angle", IEEE Transactions on Magnetics, Volume 25, September 1989, pages 3713–3715, describe a further technique for reducing skew effects in a railed slider assembly. Clifford et al suggests the use of transverse slots across both rails which function as pressure relief areas to enable achievement of a more uniform fly height. Other pressure relief structures in railed air bearing sliders can be found in U.S. Pat. No. 4,802,042 to Strom.

Other shaped air bearing sliders that employ rails may be found in "Magnetic Head With Aero-Shaped Air Bearing Surface" by Balster et al., Research Disclosure, Jan. 19, 1991, number 321; U.S. Pat. Nos. 4,984,114 to Takeuchi et al; 4,218,715 to Garnier; 4,984,740 to Chhabra et al.; 4,734,803 to Nishihira and 5,062,017 to Strom et al.

U.S. Pat. No. 4,757,402 to Mo discloses a slider assembly with a circular bearing pad that presents a substantially equal cross sectional area to an air film moving with media even when the slider is skewed relative to the oncoming air film.

As above indicated, a slider with narrow rails is very sensitive to skew. Sliders actuated by linear actuators rarely are subject to more than 10° of skew. In disk drives that use rotary actuators, however, the skew angle can be as large as 20°. When an air bearing slider of the standard taper/flat configuration is used with a rotary actuator, the actuation arm is generally tangent to the disk's inner data tracks. This leads to a long actuator arm with considerable inertia.

While the prior art describes how various slider configurations can be designed to cope with the problems of skew, it generally does not address the question of minimizing speed and skew dependence, together. Typically, prior art sliders have taper angles of 10 milliradians or larger. At such large taper angles, a slider's aerodynamic lift decreases with increasing taper angle (i.e. in aeronautical parlance, a "stall" regime). The tapers of most prior art sliders operate in the stall regime in that they employ a large taper angle. The primary reason is for manufacturing ease in that it is easier to assure that the intersection formed by the juncture of slider's taper and flat regions ends up at the correct location when the taper angle is large. However, a cost of such a high taper angle is that in the stall regime, lift becomes highly speed dependent, even at normal operating speeds.

A further problem with a large taper angle is that at medium and high disk speeds, air is regurgitated from the taper region. As a result, a sliders' taper regions are exposed to relatively large amounts of contaminated air which never enter the flat rail sections of the slider. This may cause debris accretion in the taper area that contributes to head crashes since it modifies the shape of the air bearing in the crucial entry region.

Accordingly, it is an object of this invention to provide an improved air bearing slider for magnetic recording.

It is another object of this invention to provide an improved air bearing slider that avoids the problem of regurgitated air from the slider's taper region.

It is yet another object of this invention to provide an improved air bearing slider that is less sensitive to skew.

It is yet another object of this invention to provide an improved air bearing slider structure which exhibits low stiction, low take-off and landing speeds, a fly height that is substantially insensitive to skew and disk speed variations, and a substantial insensitivity to slider crown variations.

SUMMARY OF THE INVENTION

An air bearing slider incorporating the invention has both front and rear pads extending from a generally planar body. Both pads have bearing faces separated by a gap that is substantially in excess of any fly height of the slider. The sides of both pads are oriented at a rake angle that is approximately equal to the maximum expected skew angle. The separation of the pads enables the slider to exhibit good pitch stability, and the pad rake angles provide resistance to roll effects that occur at large skew angles. Both pad faces exhibit extremely small taper angles that enable "inlet throttling" of air entrained by the slider. Such inlet throttling provides the slider with a fly height that is substantially independent of relative speed changes between the slider and a recording medium. A further embodiment includes a rear slider for contact recording applications

DETAILED DESCRIPTION OF THE INVENTION

Figure 1:
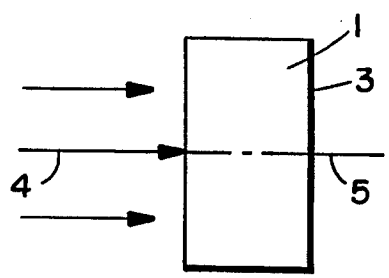
FIG. 1 is a plan view of an air bearing slider pad that has a 0° skew angle to the axis of recording surface movement.

A finding of this invention is that an air bearing slider can be rendered substantially insensitive to skew by assuring that, at all expected skew angles, leading and trailing edges of bearing pads do not change. This can be better understood by referring to FIG. 1, wherein an air bearing pad 1 has a leading edge 2 and trailing edge 3 and is oriented at right angles to axis 4 of recording surface movement. Pressure exerted on pad 1 by entrained air between the bearing surface of pad 1 and the recording surface is directly related to the length of leading edge 2. Under the conditions shown in FIG. 1, equal pressures are exerted on the bearing surface of pad 1 on either side of pad centerline 5.

Figure 2:
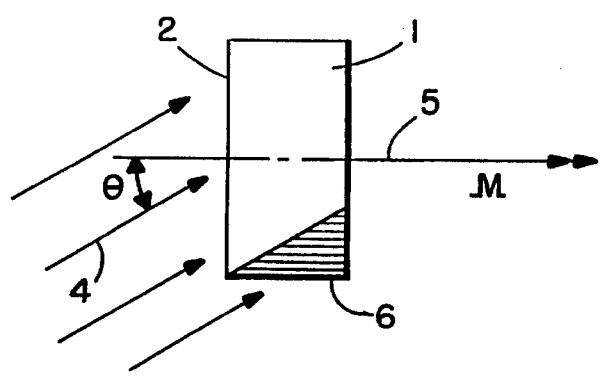
FIG. 2 is a plan view of an air bearing slider pad that has a θ° skew angle to the axis of recording surface movement.
Figure 3:
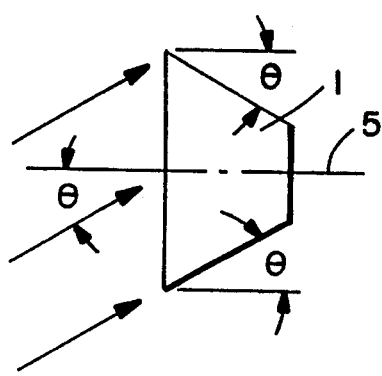
FIG. 3 is a plan view of an air bearing slider pad having a rake angle which reduces slider pad roll tendencies at skew angles up to θ°.

When, as shown in FIG. 2, centerline 5 of pad 1 becomes oriented at an angle 8 with respect to axis 4 of recording surface movement, side 6 becomes a "leading" edge of pad 1 (as well as leading edge 2). As a result, greater pressure is exerted on the bearing surface of pad 1 that falls to the right of pad centerline 5 than is exerted on the bearing surface of pad 1 to the left of centerline 5 (pressures in the cross hatched region are reduced by skew). This action causes a counterclockwise roll moment about centerline 5 to be exerted on pad 1 as indicated by the double arrow M. The skew-related roll action can be greatly diminished by causing a pad to have sides with rake angles that are at least equal to a maximum expected angle of skew θ (see FIG. 3). Under such conditions, the pad's leading and trailing edges always remain leading and trailing edges at all rake angles equal to or less than θ. It is to be noted that the use of rake angles in the manner above described, reduces the roll stiffness of the bearing pad. To regain roll stiffness, dual trapezoidal (side by side) front pads with appropriate rake angles may be used.

A further finding of this invention is that an air bearing slider having pads with extremely small taper angles exhibits fly heights that are substantially independent of disk speed. Such small taper angles create an "inlet throttle" effect on ingested air between a pad's bearing surface and the surface of a moving disk. The inlet throttling effect restricts to a constant the amount of ingested air beneath a pad's surface, thereby enabling a relatively constant fly height, irrespective of variable disk speeds. The throttling effect or metering of air flow entrained by the slider is promoted by a thin, sharp, pad leading edge.

Figure 4:
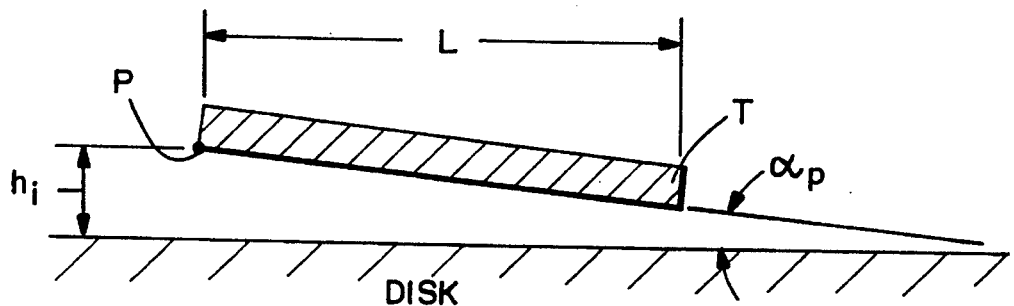
FIG. 4 is a side sectional view of an air bearing slider pad that is tilted in relation to a disk surface.

Prior to discussing specific examples of air bearing sliders that exhibit inlet throttle characteristics, the conceptual details of inlet throttling will be presented. As shown in FIG. 4, a planar, tilted pad T of an air bearing slider is positioned over a disk that moves at a speed U. An air inlet point P is defined by a leftmost point on the leading edge of tilted pad T. Point P is a distance $h_i$ above the disk, with $h_i$ defined as the inlet gap for entrained air. Tilted pad T is oriented at an angle $\alpha_p$ which is the pad taper angle relative to the disk. Pad T has a length L in the general direction of disk motion and a width W (not shown) that is normal to the paper plane of FIG. 4. So long as width W is not much smaller than L, it can be shown that inlet throttling can be achieved through the use of a small taper angle. If, as is commonly the case, W is much less than L, the pad becomes "rail-like" and inlet throttling effects are lost by side leakage.

Figure 5:
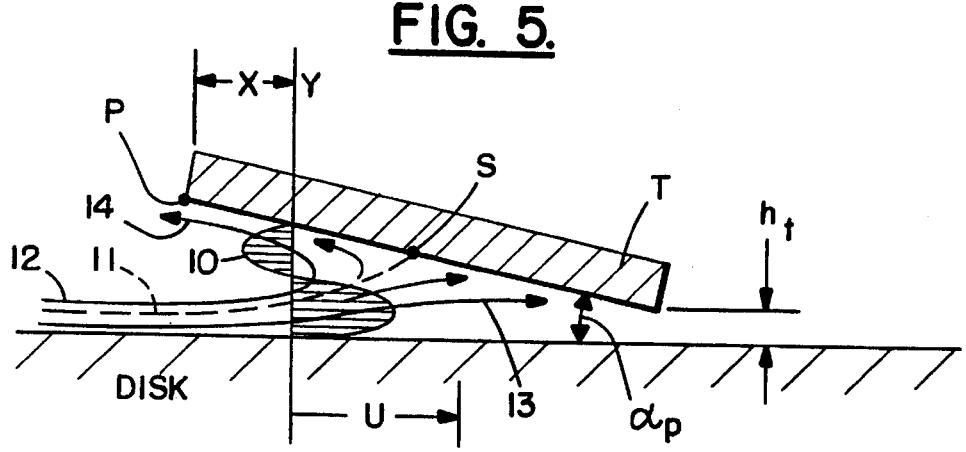
FIG. 5 is the view of FIG. 4 with an air flow pattern charted thereon showing the effect of a large taper angle.

In FIG. 5, gas flow is plotted under pad T with the portion of curve 10 (called the velocity profile) to the left of the y axis indicating a quantum of air that is regurgitated from beneath pad T. The portion of curve 10 that is to the right of the y axis indicates the portion of incoming air that proceeds beneath pad T. In the forthcoming analysis, the effects of molecular slip are ignored. Extensive computer simulations of slider bearings with molecular slip indicate that inlet throttling is not fundamentally changed by molecular slip.

An inlet air stream 12 divides, with a portion 13 passing beneath pad T and a portion 14 regurgitated from beneath pad T. Dotted line 11 indicates the dividing line between the streamlines. The dividing point S between diverging stream lines 13 and 14 is the stagnation point. Stagnation point S depends upon the operating conditions of the pad. In particular, the position of stagnation point S moves to the left with increasing disk speeds U, for a given flying height $h_t$ and a taper angle $\alpha_p$. However, it has been found that when $\alpha_p$ is equal to or less than an $\alpha_p^*$ value (the inlet throttle angle value), stagnation point S moves quickly towards leading edge inlet point P as disk speed U increases. This fact is responsible for the fast take-off behavior of sliders constructed in accord with the invention. However, if $\alpha_p$ is greater than $\alpha_p^*$, stagnation point S moves slowly to the left towards P. For commonly used disk speeds, i.e., where U is less than 50 meters per second, or in small 3.5 inch disk files, where U is about 10 meters per second, stagnation point S does not reach inlet point P within the normal speed ranges of the disk file. More particularly, at the normal speed ranges of such disk files, the stagnation point S wanders with speed because $\alpha_p > \alpha_p^*$.

Figure 6:
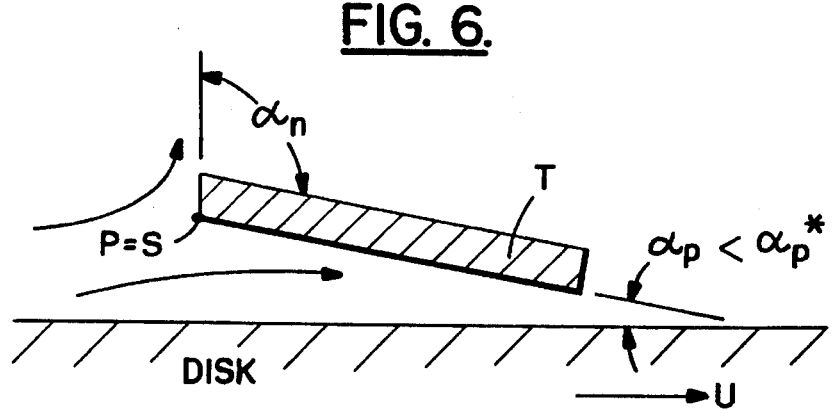
FIG. 6 is the view of FIG. 4 when the taper angle causes a pad to be "inlet-throttled".

A principal feature of air bearing sliders that incorporate the invention is to cause the location of stagnation point S to remain at inlet point P as much as possible so as to assure a constant amount of entrained air beneath pad T. When stagnation point S is "pinned" at inlet point P, pad T is defined as being "inlet throttled". Under such a condition, there is no reverse flow of air from pad T (e.g., see FIG. 6). Pinning of stagnation point S at inlet point P occurs most easily when the radius of curvature at point P is made as small as possible (e.g. as sharp as possible). In addition, the leading edge 15 of pad T should preferably have an angle $\alpha_n$ as small as possible. However, for reasons of manufacturability, $\alpha_n$ is generally 90 degrees or more. If $\alpha_n$ increases to values of the order of 150°, the entry face participates in the slider action and re-introduces speed dependence, especially at higher disk speeds.

To provide a criterion for selection of inlet throttle angle $\alpha_p^*$, the bearing number of the pad is defined as follows (see W. A. Gross, "Fluid Film Lubrication; John Wiley, 1980):

$$\text{Bearing Number} = \Lambda = \frac{6\mu\, UL}{P_a h_t^2} \tag{1}$$

where:

$\mu$=dynamic gas viscosity

U=disk speed $P_a$=ambient pressure $h_t$=trailing edge gap

It is known from the theory of self-acting air bearings that as the bearing number approaches infinity (for example, when a disk speed becomes very large or the gap $h_t$ is very small, or both), the limiting form of Reynolds' equation is:

$$ph = C_1 = P_a h_i \tag{2}$$

where:

p=gas film pressure h=gas film gap $C_1$=constant depending only on inlet conditions.

$h_i$=inlet gap

The velocity u of the gas flow can be written as:

$$u = U\left(1 - \frac{y}{h}\right) + \frac{1}{2\mu}\left(\frac{dp}{dx}\right)(y^2 - yh) \tag{3}$$

where:

$$\frac{dp}{dx}$$

is the pressure gradient of the gas flow.

y=coordinate orthogonal to recording surface

FIG. 5 shows a particular instance of the velocity profile given by equation 3.

If $\partial u/\partial y = 0$ anywhere within the gas film when y=h, then S is located somewhere within the length L of pad T.

There is a characteristic condition at which S starts to deviate from P that happens when:

$$\frac{\partial u}{\partial y}\bigg|_{y=h} = 0. \tag{4}$$

To keep S at P, it is required that $$\frac{h^2}{2\mu U}\; \frac{dp}{dx} \leq 1 \tag{5}$$

be valid for any $\Lambda$.

The asymptotic expression (2) is now used in combination with expression (4) to derive an expression for inlet throttle pad angle $\alpha_p^*$.

For the tilted pad T, at characteristic conditions:

$$\frac{dh}{dx} = -\alpha_p^* \tag{6}$$

Thus, using expression (2)

$$p = \frac{p_a h_i}{h}$$

$$\frac{dp}{dx} = -\frac{P_a h_i}{h^2}\; \frac{dh}{dx} \tag{7}$$

$$\frac{dp}{dx} = \frac{p_a h_i}{h^2}\, \alpha_p^* \tag{8}$$

Inserting $$h^2 \frac{dp}{dx}$$

into equation (5)

$$P_a h_i \alpha_p^* \leq 2\mu U$$

$$\alpha_p^* \leq \frac{2\mu U}{P_a h_i} \quad (9)$$

Expression (9) may now be used as a guide in choosing a pad taper angle that will enable inlet throttling to occur beneath an air bearing slider. As an example, assume the following values:

$\mu = (18)(10^{-6})$ Nsec/m$^2$

U=1 m/sec $h_f$=300 nm $P_a$=10$^5$ N/m$^2$

To assure that there is no reverse flow at U=1 m/sec, expression 9 indicates that $\alpha_p^*$ is approximately 1.3 milliradians. At higher disk speeds experienced with modern disk drives, typical pad angles will be chosen in the range of 100–500 microradians. The practical lower limit on $\alpha_p$ is set by the air bearing slider and disk flatness characteristics. The flatter the air bearing slider and the disk are, the smaller $\alpha_p$ can be. Under no circumstance must the pad angle be negated by waviness of the disk.

Figure 7:
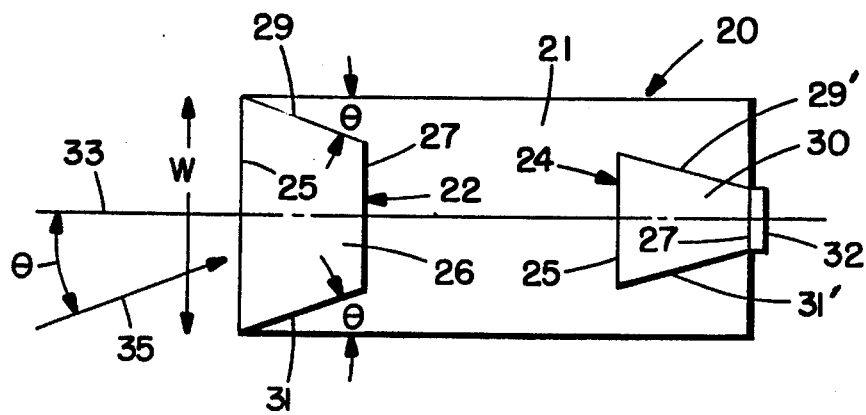
FIG. 7 is a plan view of a bearing pad side of an inlet-throttled air bearing slider with rake angles constructed in accordance with the invention.
Figure 8:
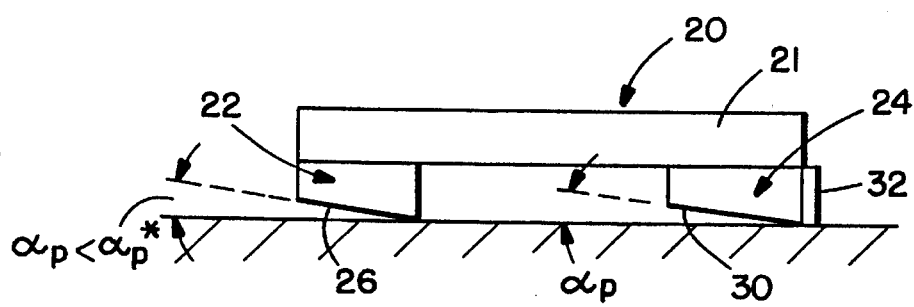
FIG. 8 is a side view of the air bearing slider of FIG. 7, when at rest on a disk surface.
Figure 9:
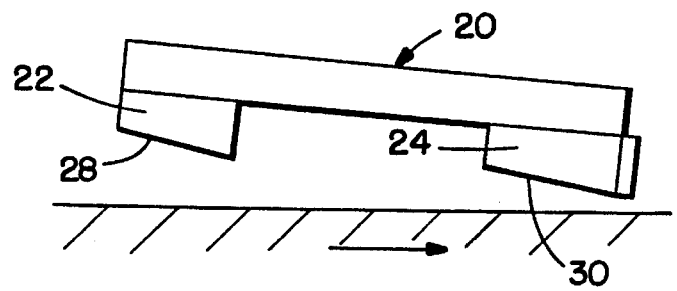
FIG. 9 is a side view of the air bearing slider of FIG. 7, when the disk surface is at operating speed.

Turning to FIGS. 7–9, an air bearing slider 20 is shown that includes pads having taper angles that enable inlet throttle effects to be exhibited by slider 20. The longitudinal separation distance d between pads on air bearing slider 20 is selected to be large enough to prevent pitch instability. Air bearing slider 20 comprises a main body portion 21 having leading and trailing, downwardly depending pads 22 and 24. Pad 22 has a bearing surface 26 whose angle is inclined with respect a disk surface 28 at an angle $\alpha_p \leq \alpha_p^*$. Similarly, bearing surface 30 of pad 24 also exhibits a similar taper angle $\alpha_p$. A magnetic head 32 is attached to the trailing edge of pad 24 in the known manner.

Bearing surfaces 26 and 30 are both trapezoidal in shape with each pad having a leading edge 25, a trailing edge 27 and a pair of sides 29, 31 and 29', 31', respectively. Sides 29, 31 and 29', 31' are each oriented at an angle θ with respect to centerline 33 of air bearing slider 20. θ is the maximum skew angle to which slider 20 will be subjected and is illustrated in FIG. 7 by the angle between vector 35, representing the direction of movement of a recording surface beneath slider 20 and centerline 33 of slider 20. Thus, at all skew angles of θ or less, leading edge 25 remains the only leading edge of slider 20 and trailing edge 27 remains the only trailing edge. As a result, entrained air beneath bearing surfaces 26 and 30 exerts substantially equal and skew-independent pressures on either side of centerline 33 and skew-related roll tendencies of slider 20 are minimized.

More generally, the pad rake angles should satisfy the following skew rule. Assuming the pad operates under inlet throttled conditions (i.e., implying that p=h$_i$/h at any point on the pad); and that the bearing pad's leading edge is at a uniform height from the disk; and that the bearing pad is a tilted plane pad, it can be shown that pad pressure at any point on the pad is insensitive to skew angle θ with appropriately raked pad angles. The bearing pad obeys the skew rule if the bearing's leading edge is straight, finite, and the pad's trailing edge lies within a trailing isosceles triangle whose sides emanate from the pad's front edge at the maximum expected skew angle.

In FIG. 8, air bearing slider 20 is at rest on disk surface 34. Due to the line contact between the bearing surfaces of pads 22 and 24 and disk surface 34, air bearing slider 20 exhibits low stiction when disk surface 34 begins to move. As shown in FIG. 9, when disk surface 34 is up to speed, air bearing slider 20 elevates to a flying height that is determined by the amount of gas entering between pad surfaces 28 and 30 and disk surface 34.

As above indicated, pads 22 and 24 are separated by a longitudinal distance d. Perturbation of either pad 22 or 24 thus causes mostly a gap change with hardly any pitch angle change to air bearing slider 20. Thus, pads 22 and 24 are "coupled" and enable air bearing slider 20 to exhibit substantial pitch stability. More specifically, gap changes in any pad overwhelm the destabilizing effect of a pitch angle change. It is required however that pads 22 and 24 be sufficiently distant from each other so as to assure adequate pitch stiffness. It is preferred that distance d be approximately half the length of air bearing slider 20, but such distance is an approximation and those skilled in the art may vary it within a wide range. For instance, if air bearing slider 20 is approximately 2.5 millimeters in length, distance d is approximately 1.25 millimeters.

While it is preferred (for low take-off speeds) that pads 22 and 24 extend across the entire width W of air bearing slider 20, a channel or channels parallel to the longitudinal axis of air bearing slider 20 may be provided for increased roll stiffness and improved ventilation of the recessed area. In such case, the areas of bearing surfaces 28 and 30 must still occupy a substantial portion of width W of the air bearing slider—so as to avoid rail-like effects.

A slider according to the invention is also resistive to crown variations. A positive crown (slider convex toward the disk) causes an increase of the front pad angle and an equal and opposite decrease of the rear pad angle. If the front pad angle increase occurred by itself, the rear of the slider would lift up. A decrease of pad angle at the rear pad would cause a decrease of the fly height at the rear of the slider. When the two aforesaid isolated effects occur simultaneously, as is the case when crown occurs, the fly height of the rear of the slider (trailing edge of rear pad) remains essentially unchanged. Thus, unwanted crown effects, for example those caused by disk drive warm-up and cool-down, are much less deleterious.

Figure 10:
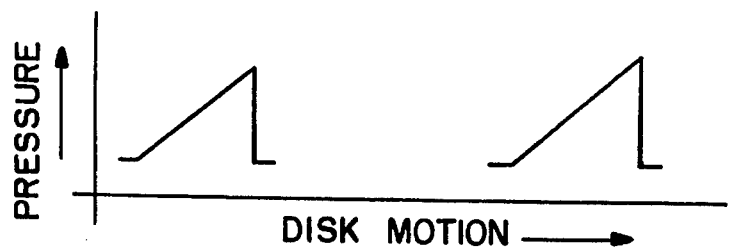
FIG. 10 is a plot of pressure versus location on the pads of the air bearing slider of FIG. 9.

From an examination of the plot of FIG. 10, it can be seen that the distribution of pressure on surfaces of pads 22 and 24 is asymmetrical (i.e. slanted "rearward") with respect to the center of each pad. Therefore, if the load on a symmetric air bearing slider with equal size front and rear pads, was applied to the center of air bearing slider 20, the slider would pitch nose down because the pitch moment of rear pad 24 would be larger than the pitch-up moment of pad 22 (due to the larger distance from the center of pressure on rear pad 24 to the center of slider 20).

By adjusting the ratio of widths of front and rear pads 22 and 24, the fly height versus speed behavior of air bearing slider 20 can be manipulated. For example, a slender front pad 22 and a stubby rear pad 24 would lead to an air bearing slider with a fly height that ultimately would decrease with speed, because the rear pad would reach an inlet throttled condition at a higher speed than the front pad.

Figure 11:
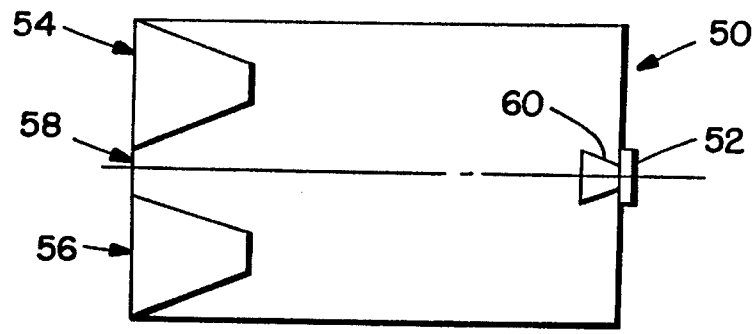
FIG. 11 is a plan view of a modified air bearing slider for contact recording on a lubricated recording surface, the slider using a contact rear pad.

Referring now to FIG. 11, an air bearing slider 50 is shown that employs the rake angle/inlet throttle features of the invention and is particularly adapted for use in contact recording applications. In general, contact recording means that the nominal recording gap between head 52 and a recording surface is maintained on the order of one microinch (25 nanometers). A liquid lubricant is employed on the recording surface to keep the recording surface from wearing away the read/write head 52 (while maintaining a distance of a few nanometers).

Slider 50 is provided with a pair of front pads 54 and 56, each of whose sides is oriented at a rake angle θ in accordance with an expected maximum skew angle θ. In addition, the bearing faces of front pads 54 and 56 are oriented to provide small taper angles so as to assure inlet throttling effects on slider 50. A channel 58 separates front pads 54 and 56 and causes the bearing areas of those pads to be concentrated towards the outer edges of slider 50 to increase the roll stiffness of slider 50 (compromising somewhat the constant spacing/speed characteristic described above).

A rear contact pad 60 extends from the undersurface of slider 50 and acts to maintain head 52 at the proper spacing from a recording surface. Contact pad 60 derives its support from pressure borne by the lubricant which, under conditions of high shear, may not behave in the usual Newtonian way. The dimensions of contact pad 60 are approximately an order of magnitude less in linear dimension than a rear "flying" pad. Given a slider body that is approximately 2 millimeters long by 1½ millimeters wide, the length and width dimensions of contact pad 60 will approximate 100× 100 microns.

While a pair of front pads 54 and 56 are shown in FIG. 11, it is to be understood that a continuous pad can be employed in lieu thereof, but at some expense to roll stiffness of slider 50. Because of pad 60's small size and the fact that it interacts with a liquid lubricant on a recording surface, when the recording surface is started up, stiction stresses are small. This allows the use of the spindle motor of low power which is a distinct advantage in small notebook-size computer applications.

Figure 12:
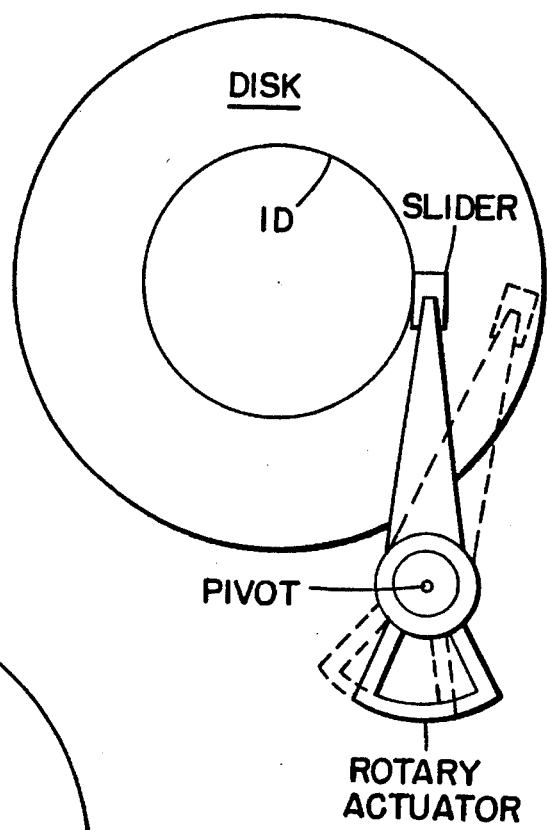
FIG. 12 is a plan view of a prior art rotary arm/disk arrangement.
Figure 13:
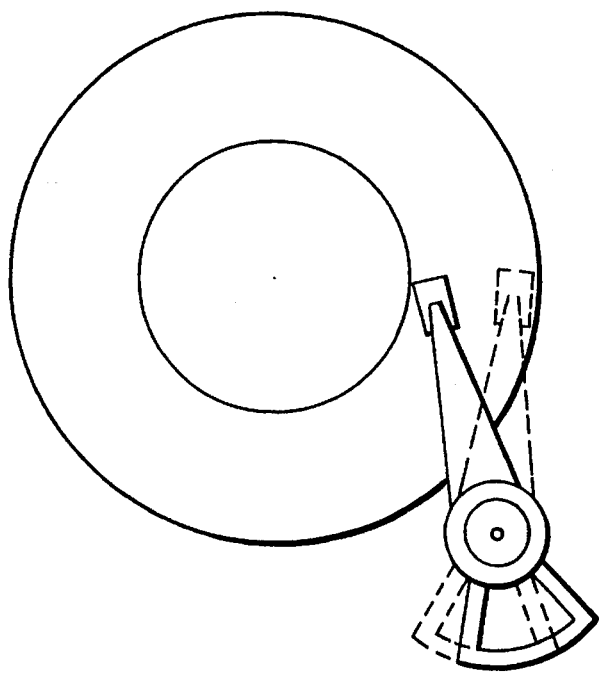
FIG. 13 is a plan view of a rotary arm/disk arrangement that uses a slider incorporating the invention hereof.

In current disk drives the slider operates with the least skew near the inner diameter (ID) of the disk. With standard taper flat sliders this choice is dictated by the need to combat a large speed dependence with an equally large skew dependence of the slider fly height. In the air bearing sliders described above, no such forced trade off is imposed. In the traditional case, zero skew at the ID forces the rotary actuator arm to be tangential to the disk ID, (see FIG. 12). With a slider incorporating the invention hereof, the location of the actuator pivot is much less constrained and can be located as shown in FIG. 13. This permits a shorter actuator arm with reduced inertia, leading to reduced access times. In the case shown in FIG. 13, the slider skews both positively and negatively. For this reason it becomes possible to use the same slider on either side of the disk, reducing the part numbers, and the possibility of inadvertent part mix up. The shorter arm also contributes to compact package design and shock resistance.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An air bearing slider having a central axis and for use in conjunction with a movable circular recording medium, said air bearing slider comprising:

front pad means and rear pad means, both extending from a generally planar body and having planar bearing surfaces opposed to said recording medium, said front pad means and rear pad means each having a leading edge and a shorter trailing edge, said shorter trailing edge of said front pad means and said leading edge of said rear pad means separated by a gap that is substantially larger than a fly height of said air-bearing slider, said planar bearing surfaces disposed in parallel orientation but not co-planar, each said front pad means and rear pad means having said leading edge and said shorter trailing edge connected by sides to create planar bearing surfaces having closed trapezoidal shapes, said front pad means and rear pad means symmetrical about said central axis, both sides of each of said front pad means and rear pad means defining an acute angle with respect to said central axis, said angle approximately equal to a maximum skew angle between said central axis and a recording track on said recording medium so that edges created by junctions between said sides and said planar bearing surfaces do not join said leading edges and junctions thereof with said planar bearing surfaces in interacting with air flow about said slider.

2. The air bearing slider as recited in claim 1, wherein said rear pad means has a planar bearing surface that is less in area than the area of the face of said front pad means.

3. The air bearing slider as recited in claim 1, wherein said planar bearing surfaces of said front pad means and said rear pad means each exhibit a taper angle $\alpha_p$, said taper angle $\alpha_p$ no greater than an inlet throttle angle value $\alpha_p{}^*$, wherein:

$$\alpha_p{}^* \leq \frac{2\mu U}{P_a h_i}$$

where:

μ=dynamic gas viscosity

U=disk speed

P=ambient pressure $h_i$=trailing edge gap, each said taper angle $\alpha_p$ causing each said front pad means and rear pad means to exhibit a stagnation line that is substantially co-located a leading edge of each respective bearing surface when said recording medium moves at operating speed, a stagnation line defining a boundary below which air is substantially entrained beneath a bearing surface, whereby an inlet throttling effect occurs at both said front pad means and rear pad means.

4. The air bearing slider as recited in claim 3, wherein said taper angles of said front pad means and rear pad means do not exceed approximately one milliradian.

5. The air bearing slider as recited in claim 4, wherein said taper angles of said front pad means and rear pad means are in a range of approximately 100 to 500 microradians.

6. The air bearing slider as recited in claim 5, wherein said planar bearing surface of said rear pad means has a smaller surface area than said front pad means.

7. An air bearing slider for supporting a transducer over a moving recording surface and having a central axis, said air-bearing slider comprising:

a slider body having a major surface opposed to said recording surface, said slider body also having leading and trailing edges oriented along an axis of motion of said recording surface;

front pad means depending from said major surface and substantially adjacent said leading edge of said slider body and having a leading edge and a shorter trailing edge, both said edges connected by sides, said front pad means thereby exhibiting a trapezoidal face opposed to said recording surface;

rear pad means depending from said major surface and substantially adjacent said trailing edge of slider body and having a leading edge and a shorter trailing edge, both said edges connected by sides, said rear pad means thereby exhibiting a trapezoidal face opposed to said recording surface, said leading edge of said rear pad means separated from a trailing edge of said front pad means by a distance that is substantially greater than a fly height of said air bearing slider, said faces of said front pad means and rear pad means, when positioned on a plane of said recording surface, both exhibiting effective taper angles at inlets which cause each said front pad means and rear pad means to exhibit stagnation lines that are substantially co-located with leading edges of said faces when said recording surface moves at operating speed, a stagnation line defining a boundary below which air is substantially entrained beneath a face, whereby an inlet throttling effect occurs at both said pad means.

8. The air bearing slider as recited in claim 7, wherein said sides of said front pad means and rear pad means each define an acute angle θ with respect to said central axis, said angle θ approximating a maximum skew angle between said central axis of said slider and an axis of motion of said recording surface.

9. The air bearing slider as recited in claim 8, wherein said taper angles of said front pad means and rear pad means do not exceed approximately one milliradian.

10. The air bearing slider as recited in claim 9, wherein said taper angles of said front pad means and rear pad means are in a range of approximately 100 to 500 microradians.

11. The air bearing slider as recited in claim 10, wherein said face of said rear pad means has a surface area that is less than the surface area of said face of said front pad means.

12. The air bearing slider as recited in claim 11, wherein said surface area of said face of said rear pad means has a surface area that is approximately 75% of the surface area of said face of said front pad means.

13. The air bearing slider as recited in claim 7 wherein said distance between said leading edge of said rear pad means and said trailing edge of said front pad means is approximately one half of a longitudinal length of said slider body along said axis of motion of said recording surface.

14. The air bearing slider as recited in claim 7 wherein taper angles $\alpha_p$ of said faces of said front pad means and rear pad means are both less than an inlet throttle angle value $\alpha_p^*$, where:

$$\alpha_p^* \leq \frac{2\mu U}{P_a h_i}$$

μ=dynamic gas viscosity
U=disk speed
$P_a$=ambient pressure
$h_i$=inlet gap.

15. The air bearing slider as recited in claim 14 wherein a channel is formed in said front pad means to provide added roll stability for said air bearing slider, and channel creating a pair of front pad means, each one of said pair having sides with rake angle of θ.

16. An air bearing slider for contact recording on a movable circular recording medium and having a central axis, said air bearing slider comprising:

front pad means and rear pad means, both extending from a generally planar body and having bearing faces opposed to said recording medium, said front pad means and rear pad means separated by a gap that is a substantial percentage of a length of said air-bearing slider, a bearing face of said front pad means when positioned on a plane of said recording medium exhibiting an effective taper angle which causes said front pad means to exhibit a stagnation line that is substantially co-located with a leading edge of said bearing face when recording medium moves thereunder at operational speed, a stagnation line defining a boundary below which air is substantially entrained beneath said bearing face, to cause an inlet throttling of entrained air therebeneath, said front pad means having a trailing edge that is shorter than said leading edge and sides connecting said edges to create a bearing face having a closed polygonal shape, said rear pad means having a bearing face whose linear dimensions are approximately an order of magnitude less than dimensions of said bearing face of said front pad means, said front pad means and rear pad means being symmetrical about said central axis and the sides of said front pad means defining an acute angle θ with respect to said central axis, said angle θ approximately equal to a maximum skew angle between said central axis and a moving recording track on said recording medium, so that edges created by junctions between said sides and said bearing face do not join said leading edge in interacting with air flow about said slider.

17. The air bearing slider as recited in claim 16, wherein said bearing face of said front pad means exhibits a taper angle $\alpha_p$, said taper angle $\alpha_p$ no greater than an inlet throttle angle value $\alpha_p^*$, wherein:

$$\alpha_p^* \leq \frac{2\mu U}{P_a h_i}$$

where:
μ=dynamic gas viscosity
U=disk speed
$P_a$=ambient pressure
$h_i$=trailing edge gap.

18. The air bearing slider as recited in claim 17 wherein a channel is formed in said front pad means to provide added roll stability for said air bearing slider, said channel creating a pair of front pad means, each one of said pair having sides with rake angles of θ.

19. Apparatus comprising:

a rotatable magnetic disk recording surface;
an air bearing slider having a central axis and a generally planar body including front pad means and rear pad means, both extending from said generally planar body and having planar bearing surfaces opposed to said recording surface, said front pad means and rear pad means each having a leading edge and a shorter trailing edge, said shorter trailing edge of said front pad means and said leading edge of said rear pad means separated by a gap that is substantially larger than a fly height of said air bearing slider, said planar bearing surfaces disposed in parallel orientation but not co-planar, each said front pad means and rear pad means having said leading edge and said shorter trailing edge connected by sides to create said planar bearing surfaces in a form of closed trapezoidal shapes, said front pad means and rear pad means symmetrical about said central axis, both sides of each of said front pad means and rear pad means defining an acute angle with respect to said central axis, said angle approximately equal to a maximum skew angle between said central axis and a recording track on said recording surface so that edges created by junctions between said sides and said planar bearing surfaces do not join said leading edges and junctions thereof with said planar bearing surfaces in interacting with air flow about said slider; and a transducer coupled to said air bearing slider at said shorter trailing edge of said rear pad means.

* * * * *